(12) United States Patent
Fulton

(10) Patent No.: US 7,458,750 B2
(45) Date of Patent: Dec. 2, 2008

(54) PIPE CONVEYOR SYSTEM

(75) Inventor: Lawrence Henry Fulton, Cheyenne, WY (US)

(73) Assignee: EJTJ Tech L.L.C., Cheyenne, WY (US)

( * ) Notice: Subject to any disclaimer, the term of this patent is extended or adjusted under 35 U.S.C. 154(b) by 187 days.

(21) Appl. No.: 11/351,763

(22) Filed: Feb. 9, 2006

(65) Prior Publication Data
US 2007/0183848 A1 Aug. 9, 2007

(51) Int. Cl.
*E21B 19/14* (2006.01)

(52) U.S. Cl. ............ 405/154.1; 405/154.6; 414/22.62; 211/49.1

(58) Field of Classification Search .............. 405/154.1, 405/156; 414/22.51, 22.62
See application file for complete search history.

(56) References Cited

U.S. PATENT DOCUMENTS

| | | | |
|---|---|---|---|
| 3,159,896 A | 12/1964 | Pearne | |
| 3,175,693 A * | 3/1965 | Steel | 211/49.1 |
| 3,254,776 A * | 6/1966 | Brown | 414/22.61 |
| 3,666,114 A * | 5/1972 | Davis | 211/59.2 |
| 5,188,503 A * | 2/1993 | Appelberg | 414/745.1 |
| 5,451,129 A | 9/1995 | Boyadjieff et al. | |
| 5,451,956 A | 9/1995 | Lochhead | |
| 5,522,699 A | 6/1996 | Smith | |
| 5,609,457 A * | 3/1997 | Burns | 414/22.51 |
| 6,332,502 B1 * | 12/2001 | Mills et al. | 175/52 |
| 6,364,011 B1 | 4/2002 | Bergeron | |
| 6,419,029 B2 * | 7/2002 | Bayer et al. | 172/52 |
| 6,533,046 B2 * | 3/2003 | Mills et al. | 175/52 |
| 6,533,519 B1 | 3/2003 | Tolmon et al. | |
| 6,854,520 B1 | 2/2005 | Robichaux | |
| 6,860,694 B2 * | 3/2005 | Slettedal | 414/22.51 |
| 6,926,488 B1 | 8/2005 | Bolding et al. | |
| 7,261,493 B2 * | 8/2007 | Wilkinson | 405/184 |
| 2003/0015488 A1 | 1/2003 | Forsyth | |
| 2003/0039509 A1 | 2/2003 | McIvor | |
| 2004/0190995 A1 | 9/2004 | Matsushita et al. | |

* cited by examiner

*Primary Examiner*—Tara L. Mayo
(74) *Attorney, Agent, or Firm*—Craig Miles; CR Miles, P.C.

(57) ABSTRACT

A pipe conveyor system which operates to assemble and disassemble a plurality of pipes.

25 Claims, 16 Drawing Sheets

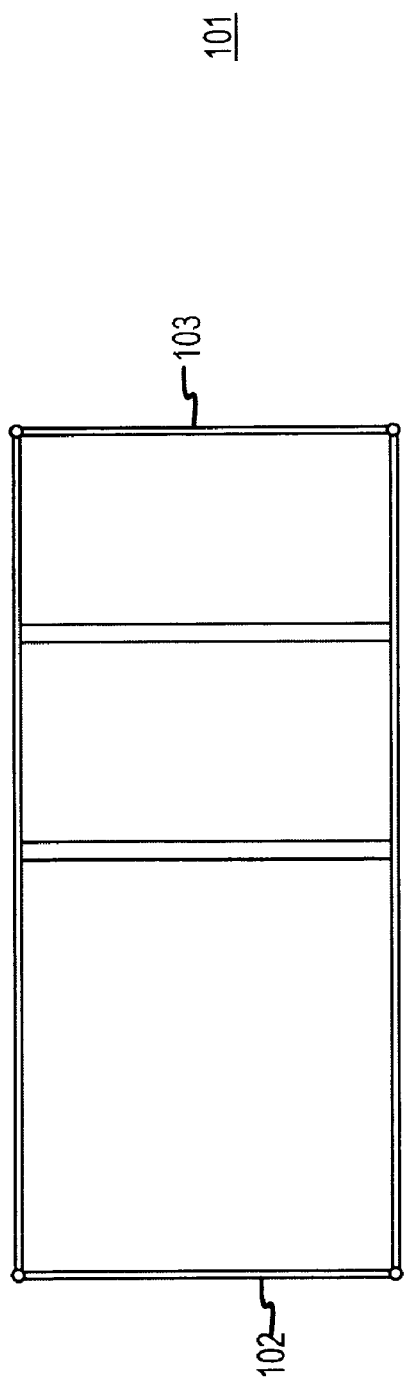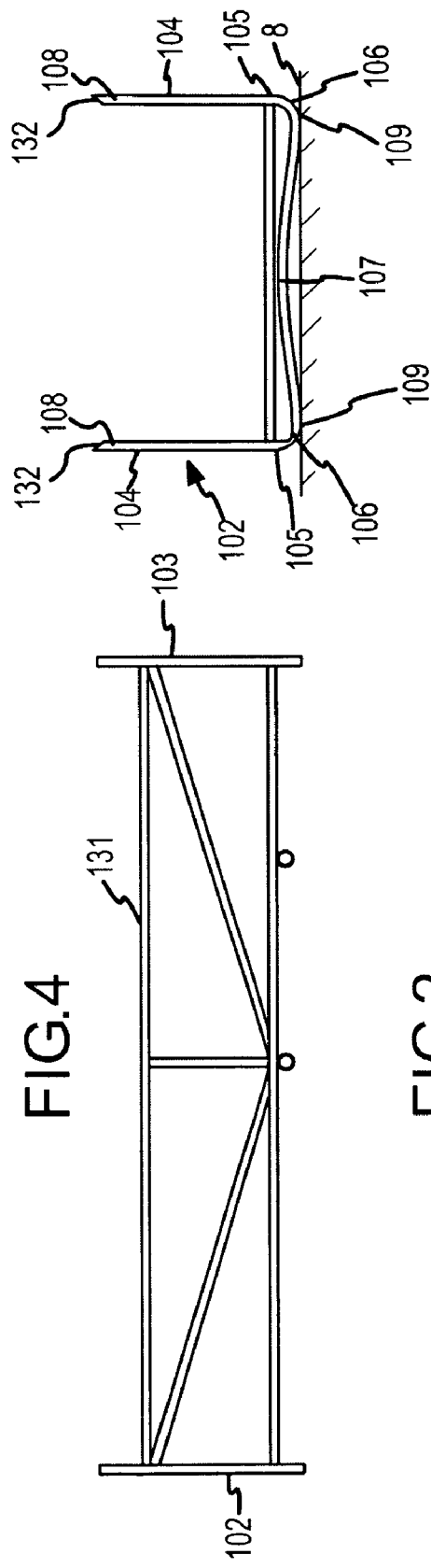

PIPE CONVEYOR SYSTEM

I. BACKGROUND

A pipe conveyor system which operates to assemble and disassemble a plurality of pipes.

A numerous and wide variety of pipe can be obtained in sections which can be assembled and disassembled to generate a required length of pipe. Because the pipe sections may be difficult to transport or assemble and disassemble by hand, a variety of devices have been built to assist in the transport, assembly and disassembly of certain types of pipe sections, such as well drilling and well casement pipe.

With respect to irrigation pipe sections (and other types of pipe sections laid on the surface of the ground or in trenches), however, the conventional manner of assembly or disassembly appears to remain the use of manual labor to lift each section from the ground, truck, trailer, or other transport means, to align the irrigation pipe sections end to end along the desired path on the support surface, and to join the opposed ends by telescopic or other mated engagement. While the use of manual labor to assemble or disassemble irrigation pipe sections (or other types or kinds of pipe sections) can be time consuming, dangerous and expensive, it appears that no device has been improvised to assist in the assembly or disassembly of the pipe sections.

II. SUMMARY OF THE INVENTION

Accordingly, a broad object of the invention can be to provide a pipe conveyor which can be operated by a pipe conveyor user to assemble and disassemble a plurality of pipes such gated agricultural pipe.

A second broad object of the invention can be to provide a movable frame in which a plurality of pipes can be retained and which further provides a pipe elevator to adjust the location of the pipes within the frame such that each of the plurality of pipes can be transferred to a pipe receiver which fitted with a pipe check can be operated to provide serial delivery of each one of such plurality of pipes to a pipe transfer element which locates one each of the plurality of pipes serially on a pipe support surface such that a pipe end of a first of the plurality of pipes can be joined with the pipe end of another of the plurality of pipes prior located on the pipe support surface and by repeating the method a continuous length of pipe can be assembled.

A third broad object of the invention can be to provide a movable frame which provides a pipe support surface on which a pair of pipes joined end to end can be disassembled with one of pipes transferred from the support surface with a pipe transfer element to a pipe receiver surface which adjusts angle to allow the pipe to transfer from the pipe receiver surface to the within the movable frame.

A fourth broad object of the invention can be to provide a first pipe restraint and a second pipe restraint each of which engage a portion of the external surface of the first of a plurality of pipes transferred to the pipe support surface and further operate to generate sufficient movement of the first of the plurality of pipes to establish coaxial alignment (and in certain embodiments co-axial engagement) of the first of the plurality of pipes with another of the plurality of pipes engaged by a third pipe restraint on the pipe support surface.

A fifth broad object of the invention can be to provide a first pipe restraint and a second pipe restraint each of which engage a portion of the external surface of the first of a plurality of pipes transferred to the pipe support surface and further operate to disengage joined ends of the first of the plurality of pipes and another of the plurality of pipes having a portion of the external surface engaged by a third pipe restraint to fix location on the support surface.

Naturally, further objects of the invention are disclosed throughout other areas of the specification, drawings, photographs, and claims.

III. A BRIEF DESCRIPTION OF THE DRAWINGS

FIG. 2 is a side view of an embodiment of a pipe cradle.

FIG. 3 is an end view of an embodiment of a pipe cradle.

FIG. 4 is a top view of an embodiment of a pipe cradle.

Figure 9:
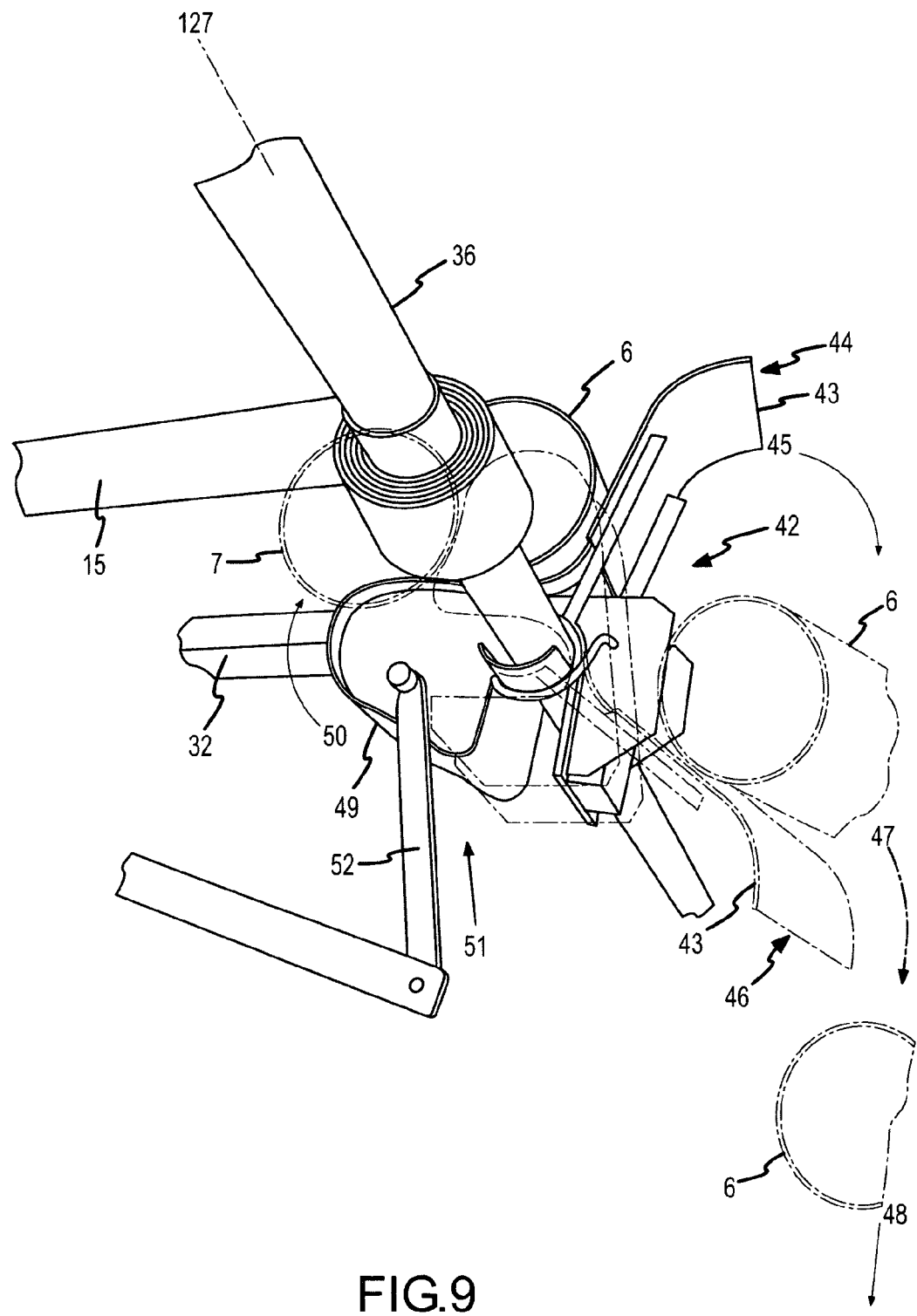

FIG. 9 is a perspective view of an embodiment of a pipe transfer check which rotates between a first pipe transfer check position and a second pipe transfer check position to alternately engage a first pipe transfer check element with the external surface of one of the plurality of pipes transferred to the pipe receiver and a second transfer check element with the external surface of a second one of the plurality of pipes transferred to the pipe receiver.

Figure 10:
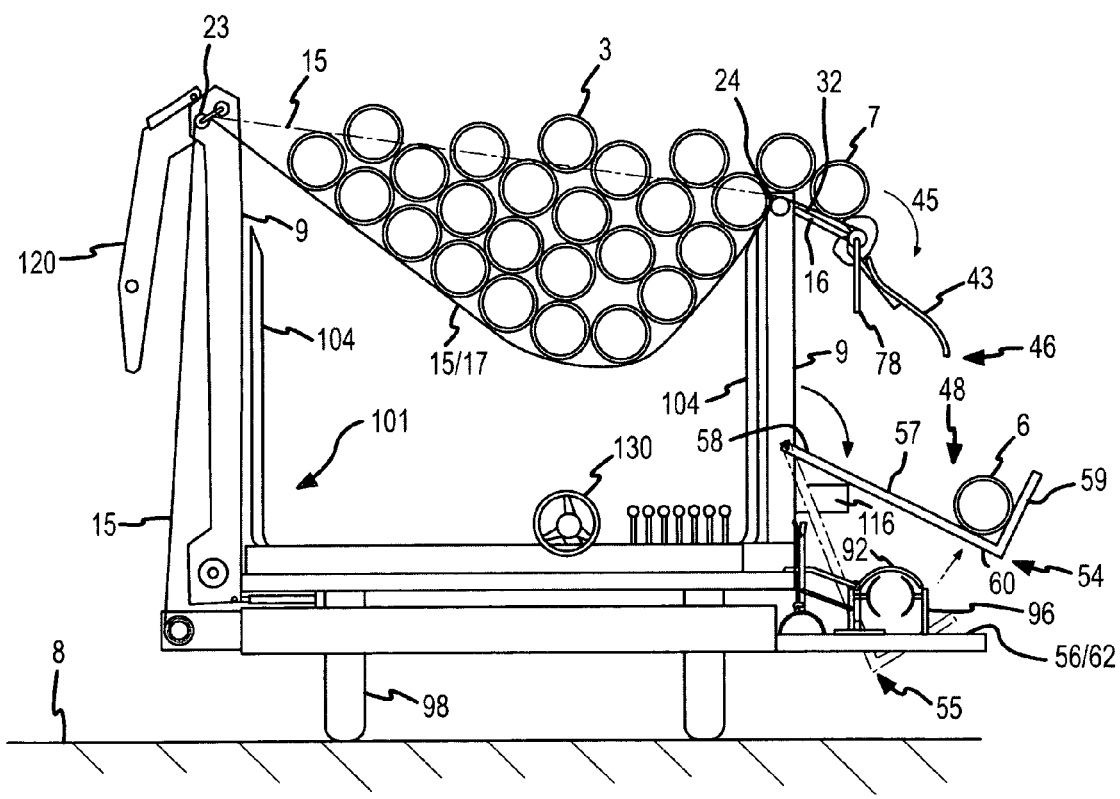

FIG. 10 is an end view of an embodiment of the pipe conveyor invention which shows a pair of the plurality of pipes transferred to the pipe receiver and the pipe transfer check established in the second pipe transfer check position to engage a second transfer check element with the external surface of a second one of the plurality pipes transferred to the pipe receiver.

Figure 11:
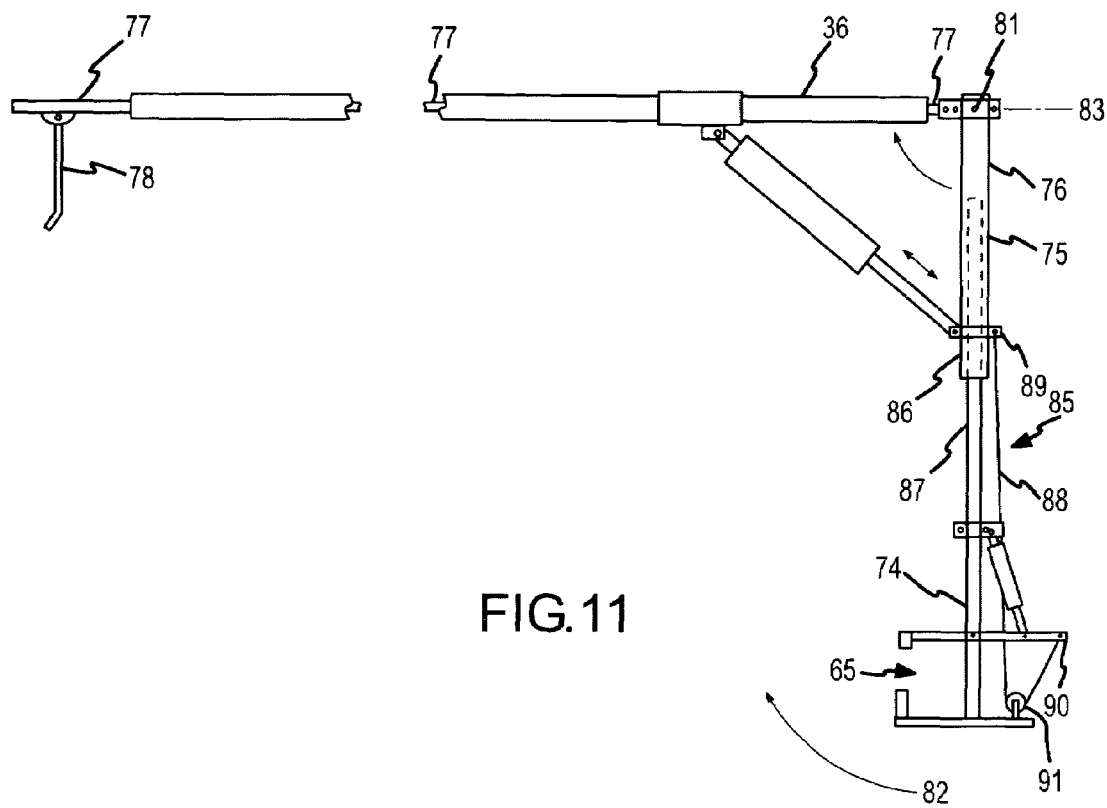

FIG. 11 is a side view of an embodiment of a first pipe restraint.

Figure 12:
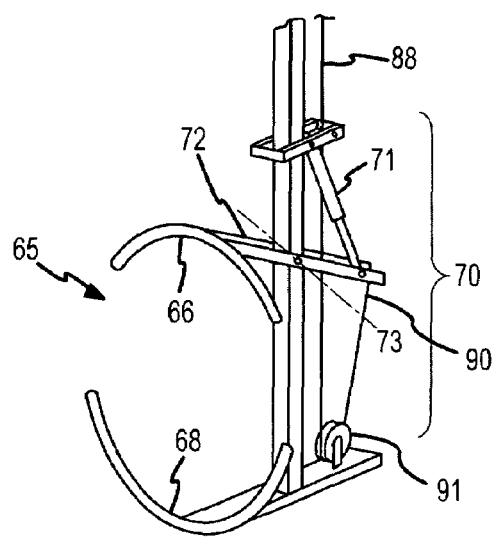

FIG. 12 is a perspective view of a portion of the first pipe restraint shown by FIG. 11.

Figure 13:
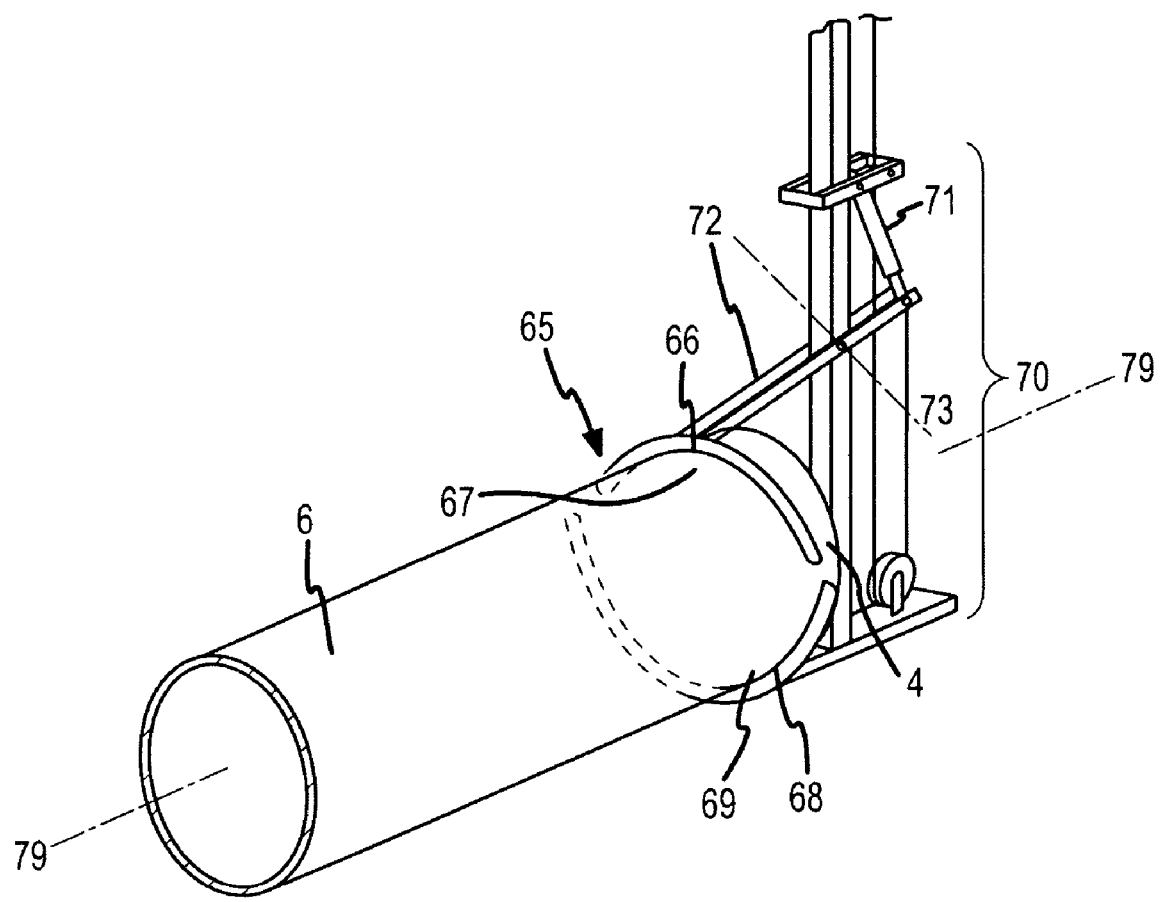

FIG. 13 is a perspective view of the portion of the first pipe restraint shown by FIG. 11 engaged with the external surface of a first pipe end of a first one of the plurality of pipes.

Figure 14:
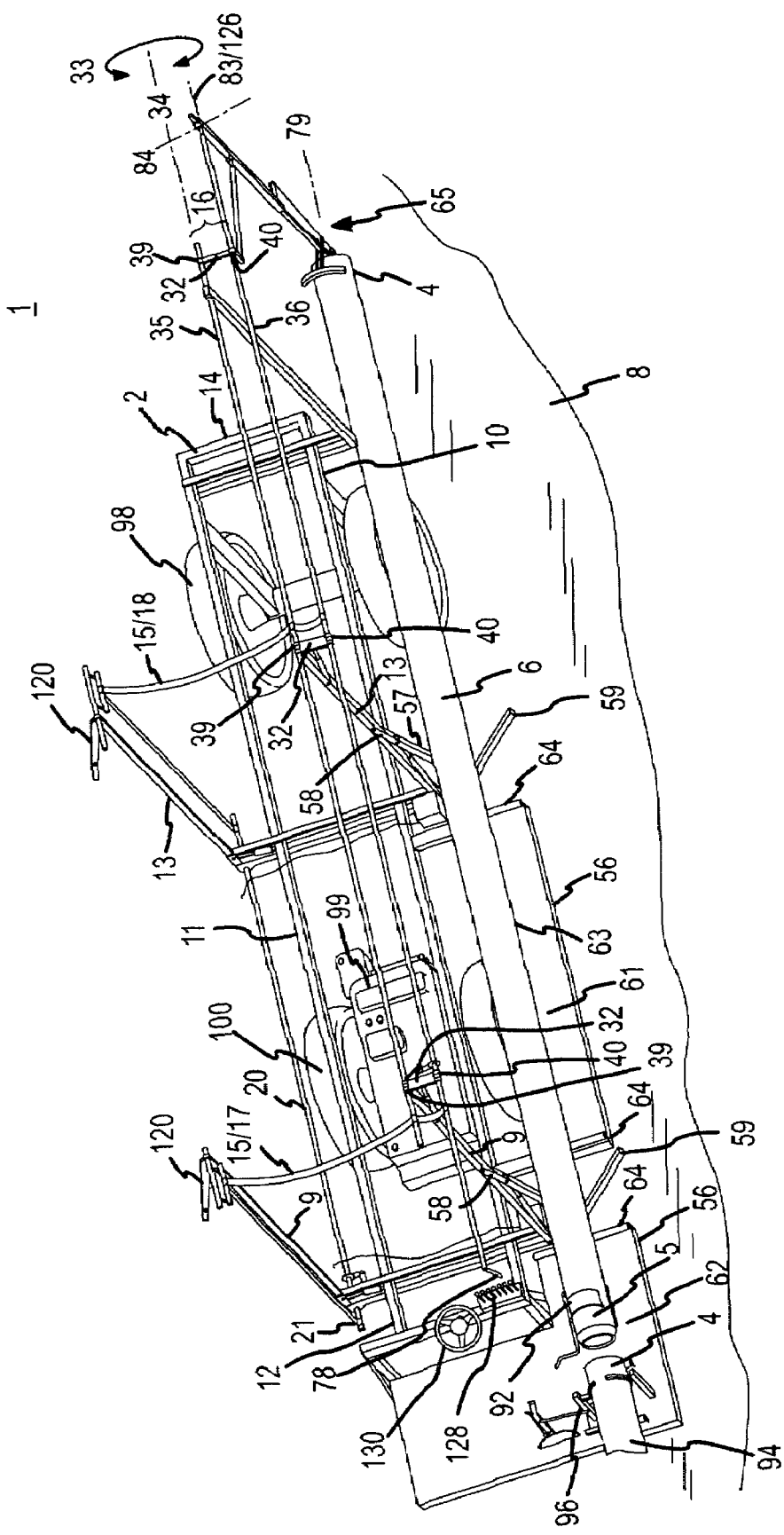

FIG. 14 is a perspective view of an embodiment of the pipe conveyer with the first restraint engaged with the external surface of the first pipe end of the first one of the plurality of pipes and a second pipe restraint engaged with the external surface of a second pipe end of the first one of the plurality of pipes and a third pipe restraint engaged with the external surface of a first pipe end of a second one of the plurality of pipes.

Figure 15:
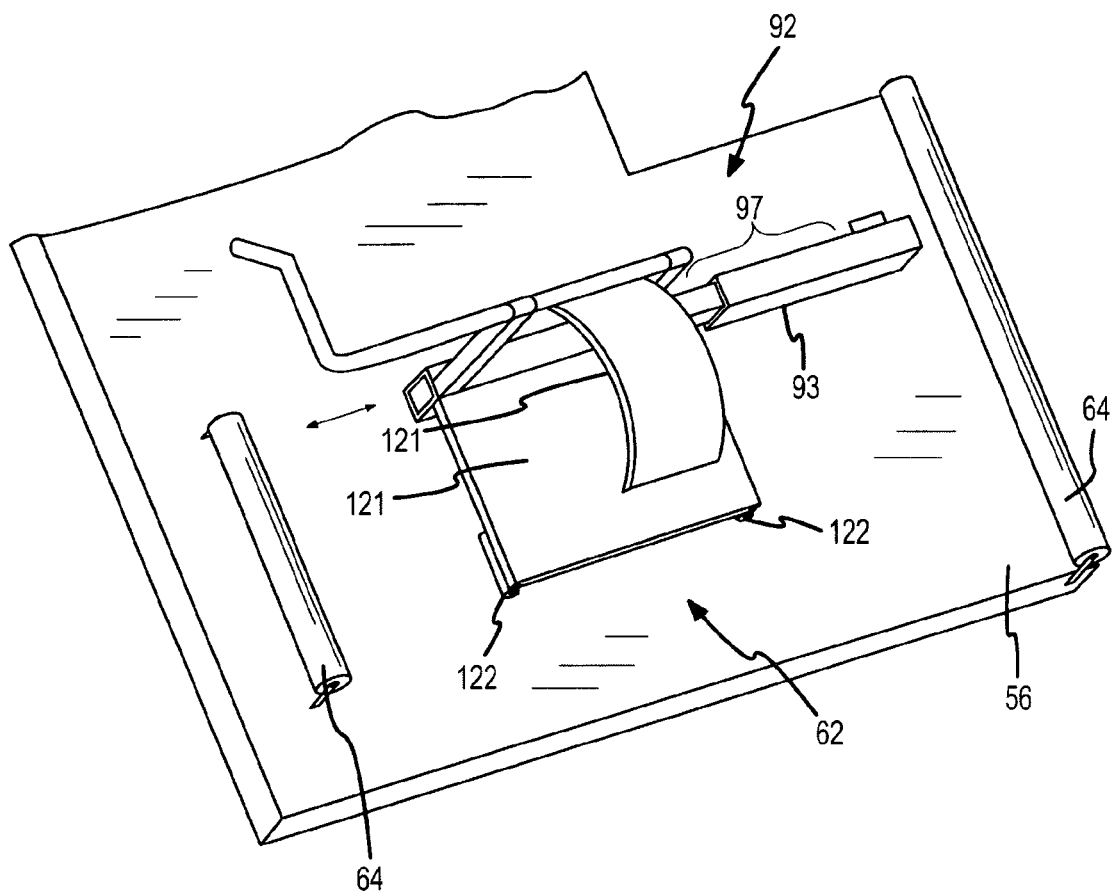

FIG. 15 is a perspective view of an embodiment of the second pipe restraint.

Figure 16:
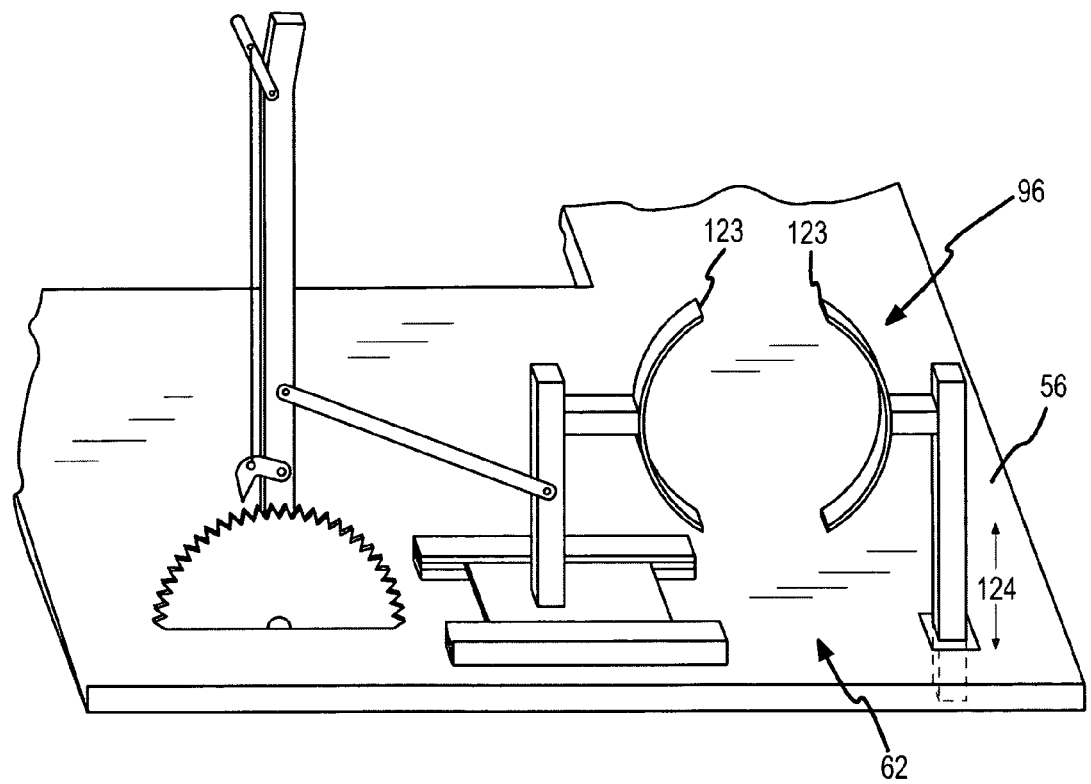

FIG. 16 is a perspective view of an embodiment of the third pipe restraint.

Figure 17:
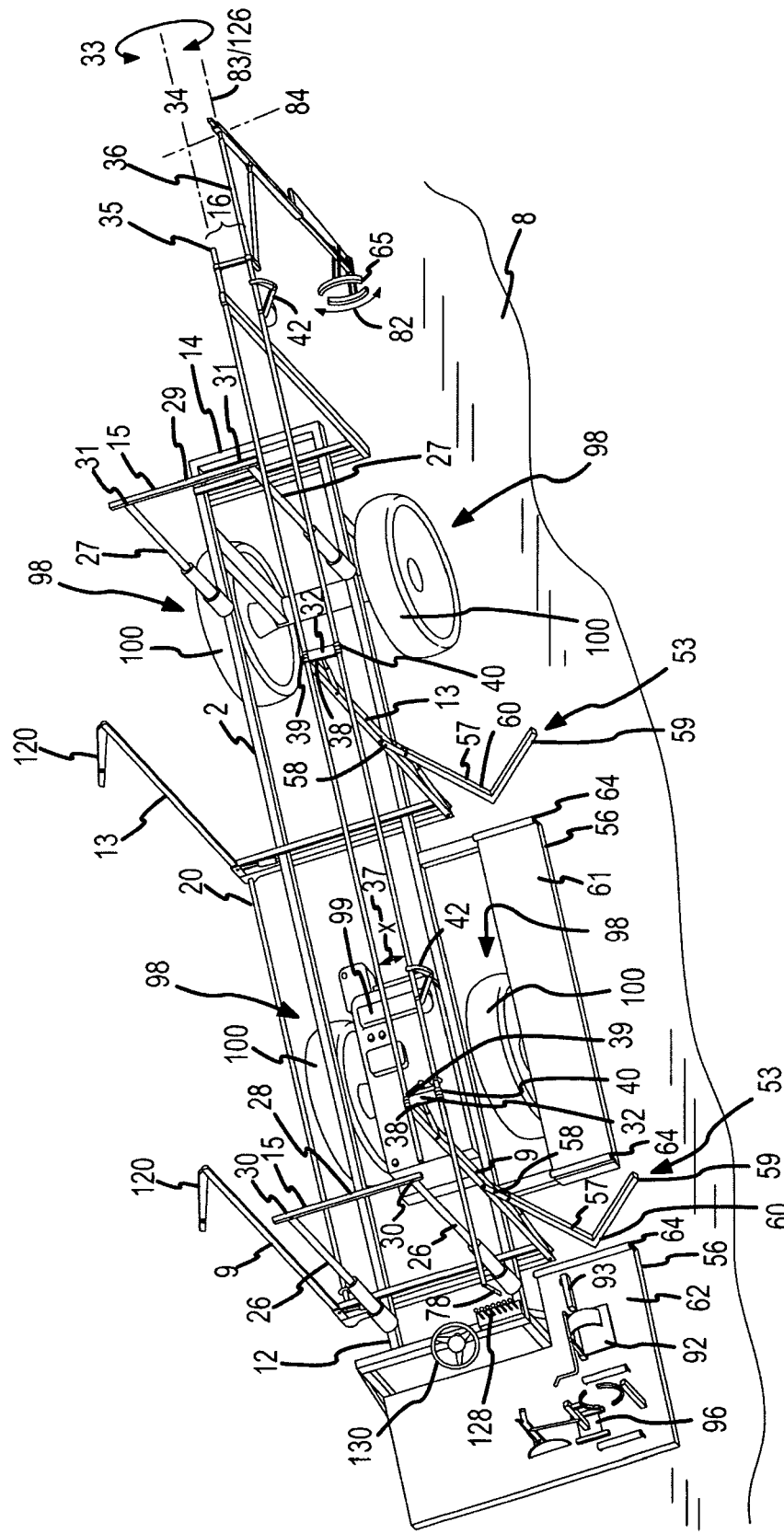

FIG. 17 is a perspective view of an embodiment of the pipe conveyor having a pipe elevator which includes a pair of telescopic members.

Figure 18:
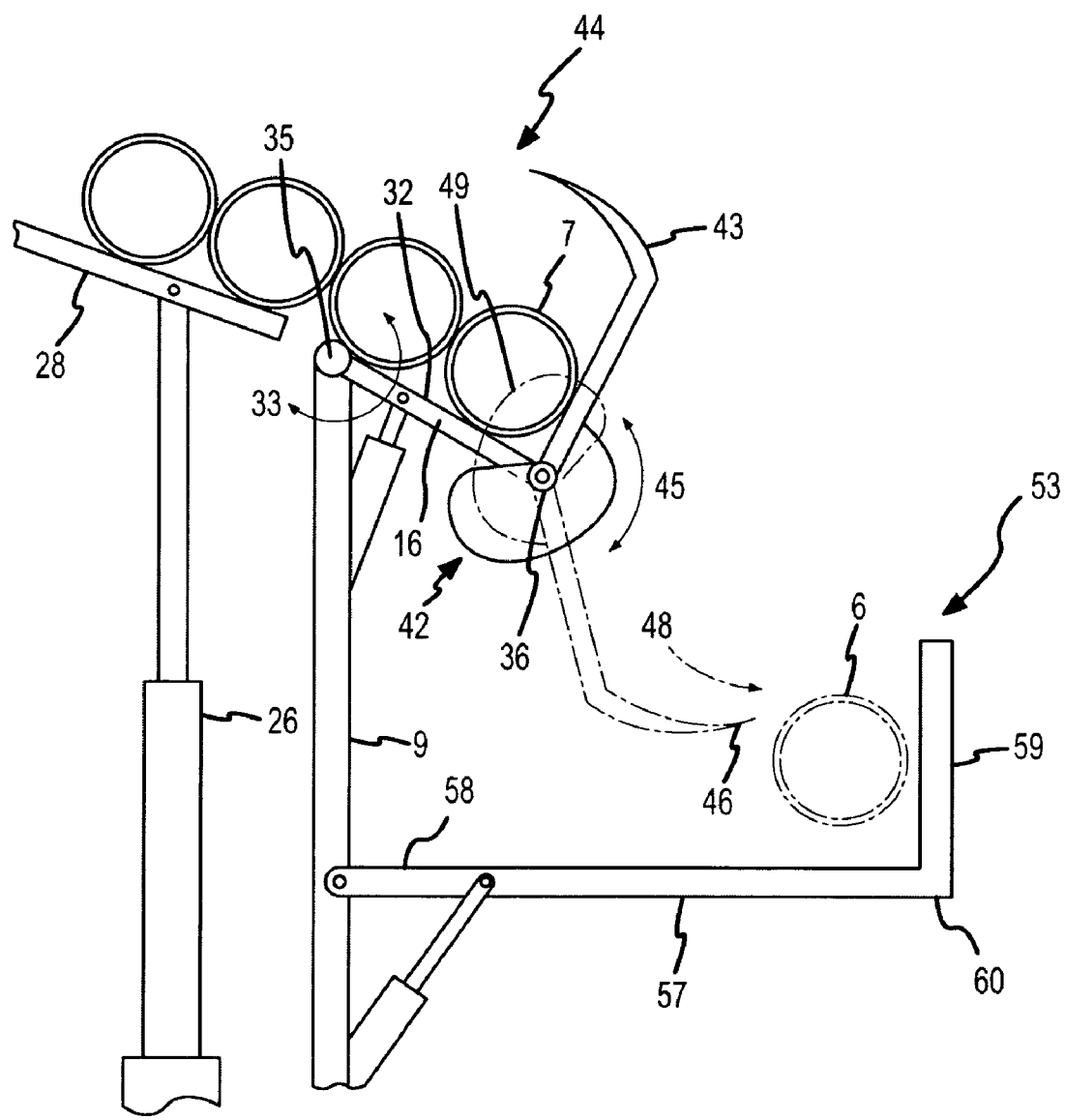

FIG. 18 is an end view of an embodiment of a pipe transfer check which rotates about a pipe transfer check pivot element to disengage a first pipe check element from the external surface of a first one of the plurality of pipes to transfer the first one of the plurality of pipes to a pipe transfer element and engage a second pipe check element with the external surface of a second one of the plurality of pipes.

Figure 19:
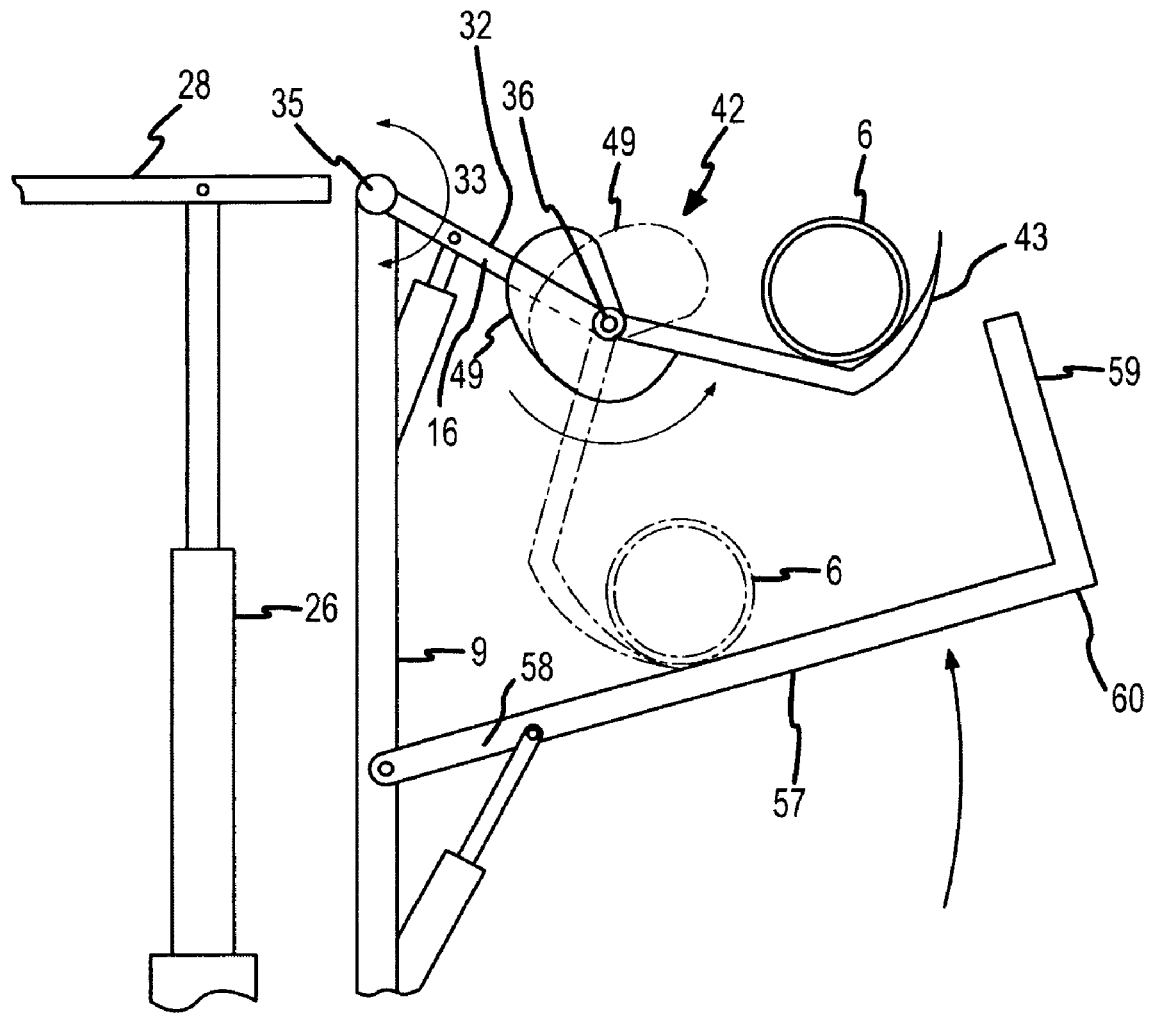

FIG. 19 is an end view of the embodiment of the pipe transfer check shown by FIG. 18 which rotates about the pipe transfer check pivot element to engage a first pipe check element with the external surface of a first one of the plurality of pipes.

IV. DETAILED DESCRIPTION OF THE PREFERRED EMBODIMENTS

A pipe conveyor which operates to assemble and disassemble a plurality of pipes and methods of assembling and disassembling a plurality of pipes with a pipe conveyor.

Figure 1:
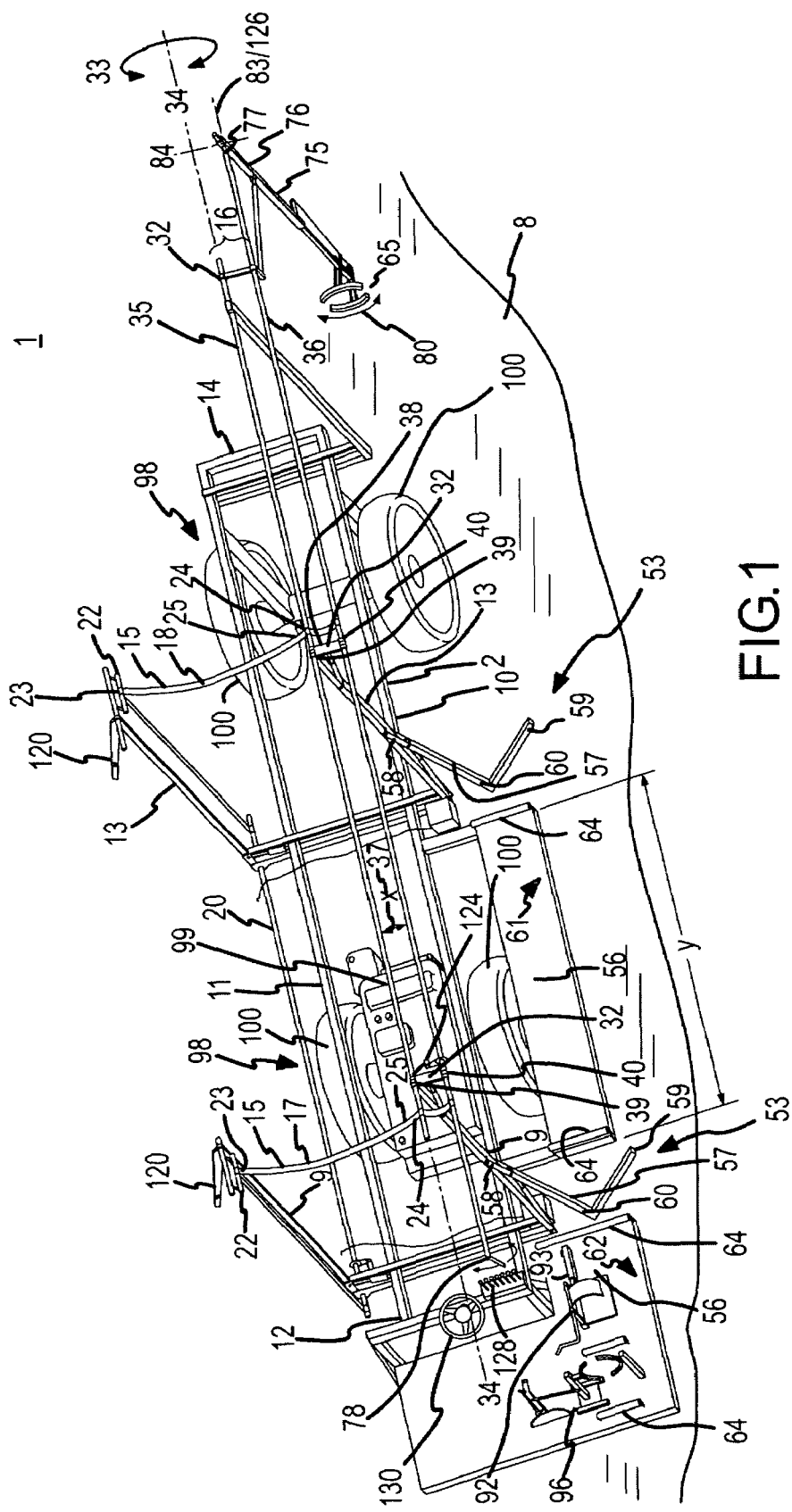
FIG. 1 is a perspective view of an embodiment of the pipe conveyor.
Figure 5:
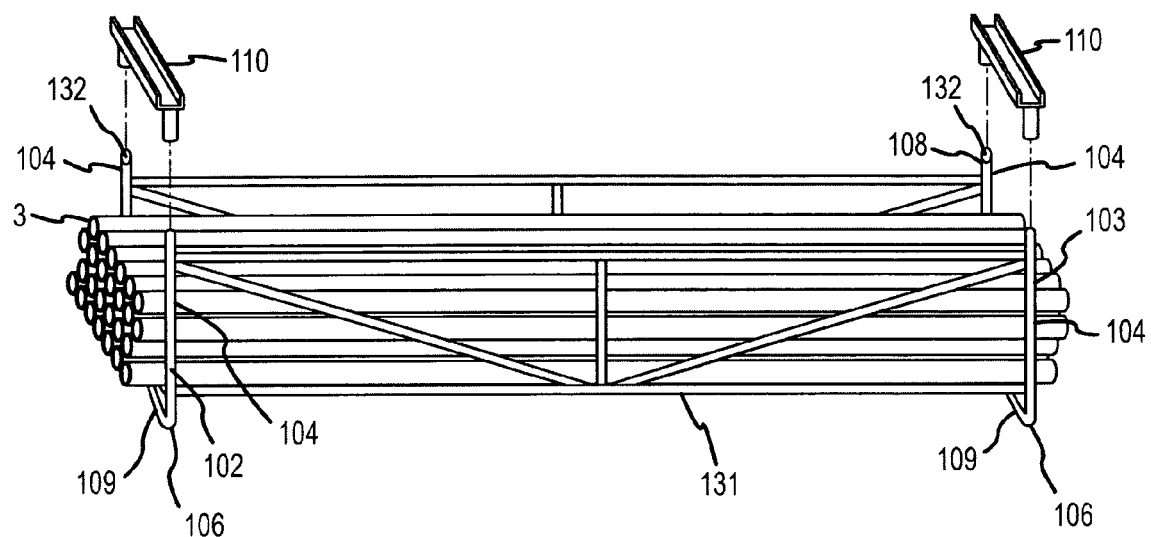
FIG. 5 is a perspective view of an embodiment of a pipe cradle in which a plurality of pipes are stacked.
Figure 8:
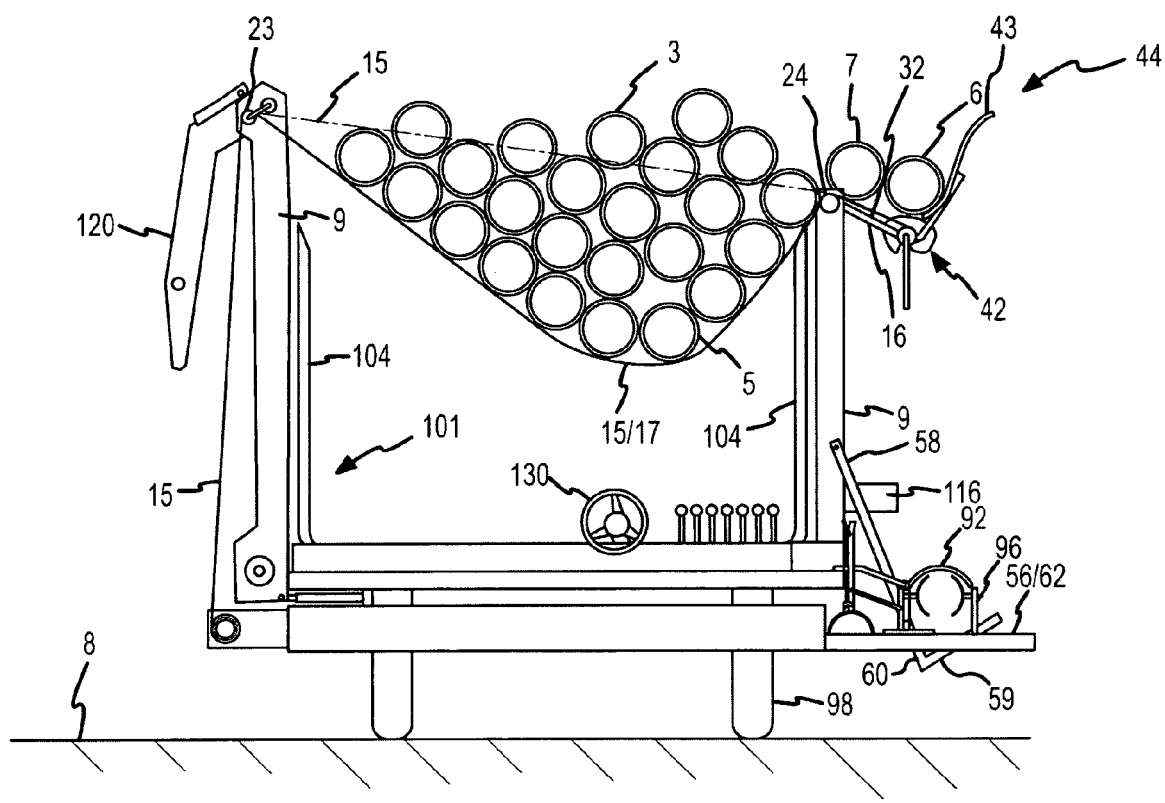
FIG. 8 is an end view of an embodiment of the pipe conveyor invention with the plurality of pipes elevated to a height within the frame of the pipe conveyor to allow at least one of the plurality of pipes within the frame to be transferred to the a pipe receiver joined to the frame.

First referring primarily to FIG. 1, an embodiment of the pipe conveyor (1) is shown which provides a frame (2) configured to within retain a pipe or a plurality of pipes (3) (see for example FIG. 8). The term "pipe" or "plurality of pipes" (3) herein refers to any manner of tubular member(s) and specifically includes, but is not limited to, irrigation pipe or irrigation pipe sections which can be obtained in diameters of between about four inches and about eighteen inches and in lengths of up to about thirty feet and which may further be perforated or gated at intervals of between about twenty inches and about forty inches or other desired interval to allow egress of fluid from within the pipe. Each one of a plurality of pipes (3), such as a plurality of irrigation pipes, may further include a first pipe end (4) (see for example FIG. 14) configured to join a second pipe end (5) (see for example FIG. 14) such that a plurality of pipes can be joined into one length of pipe. With respect to irrigation pipe for example, the first pipe end (4) of a first one of a plurality of pipes (6) can have a part of the internal surface configured to slidely engage a part of the external surface of the second pipe end (5) of a second one of a plurality of pipes (7) (as shown for example by FIG. 14). The first pipe end (4) can further include a coupler element which allows for telescopic or rotational engagement between the first one of the plurality of pipes (6) and a second one of the plurality of pipes (7) and may further provide a gasket or seal to reduce the flow of fluids between the joined internal surface of the first pipe end (4) and the external surface of the second pipe end (5). Each of the plurality of pipes (3) may further include lock elements, end plugs, or other standard or custom fittings. While the description and figures herein may provide particular examples of a pipe or a plurality of pipes (3) which appear to be an irrigation pipe or a plurality of irrigation pipes, the invention is not so limited, and numerous and varied tubular members are encompassed by or can be utilized with the invention regardless of the dimension, application, manner of joining, or material made from.

Again referring primarily to FIG. 1, an embodiment of the frame (2) configured to within retain a plurality of pipes (3) can, as a non-limiting example, provide a rectangular frame established in substantially horizontal relation to a support surface (8) (such as the surface of the earth) having at least a first pair of vertical members (9) one each coupled to opposed sides (10)(11) of the horizontal rectangular portion of the frame (2) (hereinafter "horizontal rectangular frame") proximate to a first frame end (12) and a second pair of vertical members (13) coupled to the opposed sides (10)(11) of the horizontal rectangular frame (2) disposed a distance toward a second frame end (14) (or coupled proximate to the second frame end (14) depending on the application). Understandably, the specific relation of the horizontal rectangular frame (2) to the support surface (8) and the relation of each pair of vertical members (9)(13) can vary due to irregularities in the production of the frame or in the support surface (8) or both. Moreover, the particular example shown by FIG. 1, of a frame (2) including a horizontal rectangular frame portion and at least two pairs of vertical members (9)(13) is not intended to be limiting with respect to the numerous and varied configurations of the frame (2) which can within retain a plurality of pipes (3). As shown by FIG. 8, the plurality of pipes (3) can be retained by any configuration of frame (2) which allows an embodiment of a pipe elevator (15) to establish the plurality of pipes (3) at a height within the frame sufficient to allow travel of the first one (6) of the plurality of pipes (3) from the frame (2) to a pipe receiver (16).

Now referring primarily to FIGS. 1, 6, 8, and 17, the pipe conveyor (1) invention can further include a pipe elevator (15) which operates to establish the plurality of pipes at a height or location within the frame (2). The height or location of the plurality of the pipes (3) within the frame (2) can be any height or location within the frame (2) which allows a first one (6) of the plurality of pipes (3) (see as a non-limiting example FIG. 8) to transfer from within the frame (2) to a pipe receiver (16), further described below. Naturally, as additional one each of the plurality of pipes (3) are delivered to the pipe receiver (16), the pipe elevator (15) can be further operated to adjust the height or location of the remaining plurality of pipes (3) to allow serial transfer of the remaining plurality of pipes (3) to the pipe receiver (16).

Figure 6:
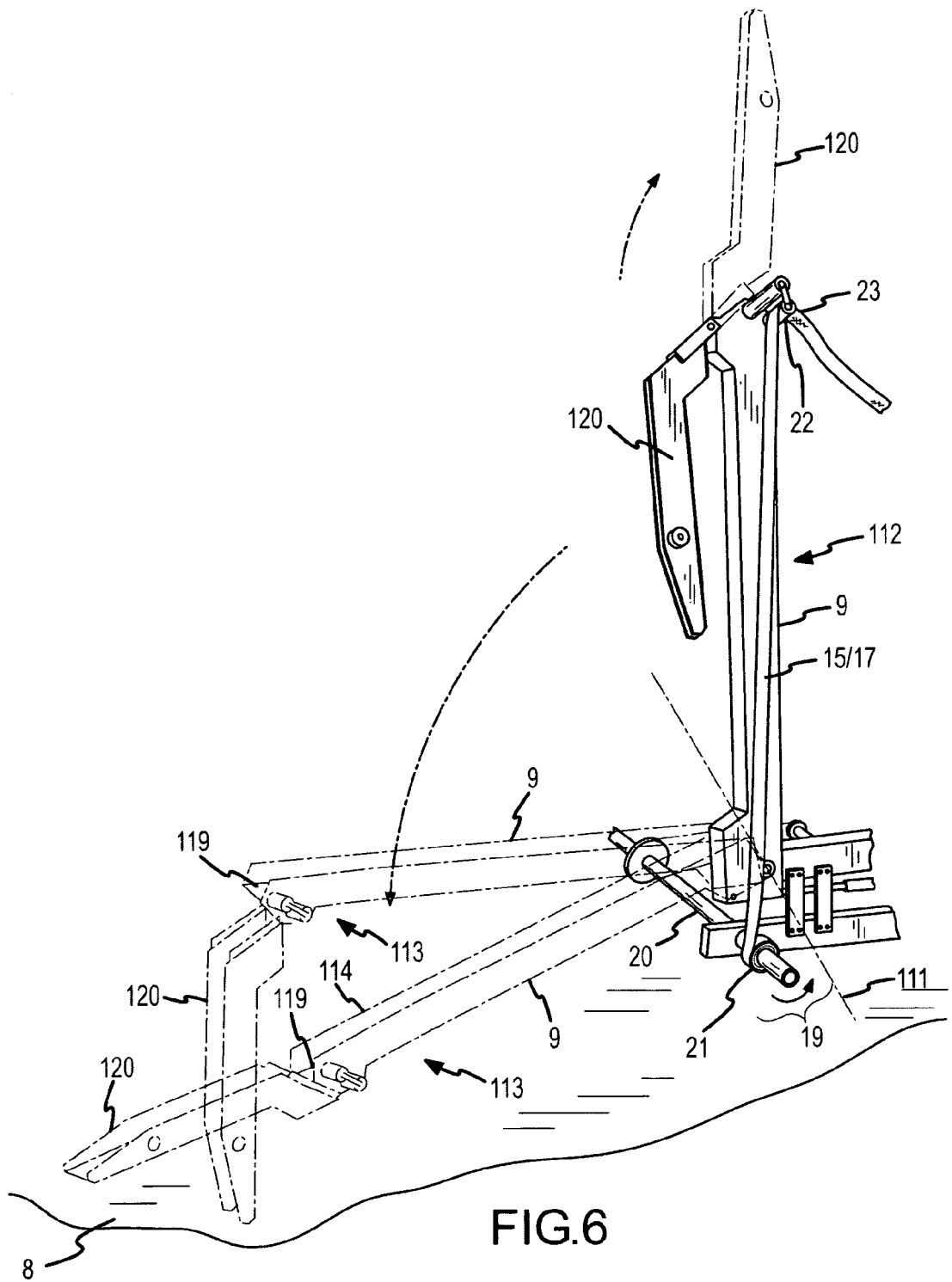
FIG. 6 is a perspective view of an embodiment of one of a first pair of vertical members of the frame which rotates about a pivot axis between a first vertical member position and a second vertical member position.

The pipe elevator can take various construction forms which achieve the above-described operation. A first non-limiting example of the pipe elevator (15) is shown by FIGS. 6 and 8 which includes a first flexible member (17) adjustably coupled between the first pair of vertical members (9) which engages a first part of the external surface of the plurality of pipes (3) proximate to the plurality of first pipe ends (5) and a second flexible member (18) adjustably coupled between the second pair of vertical members (13) which engages a second part of the external surface of the plurality of pipes (3) proximate to the plurality of second pipe ends (4). A flexible member adjustment means (19) (as shown in FIG. 6 for example) can operate to adjust the length of the first flexible member (17) and the second flexible member (18) between the first pair of vertical members (9) and the second pair of vertical members (13) respectively to establish the plurality of pipes (3) at a height within the frame (2). The embodiment of the flexible member adjustment means (19) shown in FIG. 6 includes a shaft (20) coupled to each of the first flexible member (17) and the second flexible member (18) which rotates to windly engage (21) a part of the first flexible member (17) and a part of the second flexible member (18) (as shown by FIG. 9, a second pipe receiver shaft (36) can windingly engage the first flexible member (17) and the second flexible member (18) as well). The flexible member adjustment means (19) (see for example FIG. 6) can further provides a first pair of suspensory elements (22) which fixes the height of each of the first pair flexible member ends (23) and a second pair of suspensory elements (24) which fixes the height of each of the second pair flexible member ends (25). By fixing the height of each of the first pair of suspensory elements (22) above the height of each of each of the corresponding second pair of suspensory elements (24), rotation of the shaft (20) (or the second pipe receiver shaft (36)) to windingly engage a part of the first flexible member (17) and a part of the second flexible member (18) can generate travel of the first one (6) of the plurality of pipes (3) toward the pipe receiver (16), as shown by FIG. 8 (the broken line indicating the extent of upward travel of the first flexible member (17) and the second flexible member (18) which can be achieved by winding engagement on the shaft (20)(36)). While FIG. 6 shows a flexible member (17)(18) configured as a band or strap, it is not intended that the flexible members (17)(18) be limited as such, but rather numerous and varied flexible materials could be utilized such as a flexible cord or flexible cable substantially circular in cross section, or otherwise so long as a portion of each flexible member (17)(18) can be acted upon to increase and decrease the length of the flexible member (17)(18) between the first pair of vertical members (9) and the second pair of vertical members (13) (or greater number of pairs of vertical members) to increase or decrease the height or adjust the location of the flexible members (17)(18) within the frame (2) of the pipe conveyor (1) to establish the plurality of pipes (3) at a location within the frame (2) to allow travel of at least the first one (6) of the plurality of pipes (3) to the pipe receiver (16).

Now referring to primarily to FIG. 17, a second non-limiting example of the pipe elevator (15) can include a first pair of telescopic members (26) coupled to opposed sides (10)(11) of the horizontal rectangular frame (2) proximate to the first frame end (12) and a second pair of telescopic members (27) coupled to opposed sides (10)(11) of the horizontal rectangular frame (2) proximate to the second frame end (14) (or otherwise coupled to the horizontal rectangular frame (2) disposed a distance apart sufficient to support the plurality of pipes (3) retained within the frame (2)). The telescopic members (26)(27) can be for example hydraulic cylinders, pneumatic cylinders (along with the necessary compressors, conduits and controls to generate movement of the telescopic members as would be known to the person of ordinary skill in the art, herein after "telescopic member adjustment means" (128)), or threaded shaft which upon rotation generates travel of a coupled cross member along the longitudinal axis of the threaded shaft, or the like.

A first cross member (28) can have one each of a pair of first cross member ends (30) coupled to a corresponding one each of the first pair of telescopic members (26) and a second cross member (29) can have one each of a pair of second cross member ends (31) coupled to a corresponding one each of the second pair of telescopic members (27). The telescopic member adjustment means (128) can operate to adjust length of each of the first pair of telescopic members (26) and each of the second pair of telescopic members (27) to adjust the height and angle of the first cross member (28) and the second cross member (29) to establish the plurality of pipes (3) at the desired height within the frame (2) or at a height or angle, or both, which allows a first one (6) of the plurality of pipes (3) to transfer to the pipe receiver (16) (FIG. 17 showing an example of hydraulic control valves which can be used to operate hydraulic cylinders (26)(27)). While the cross members (28)(29) coupled to the first pair of telescopic members (26) and the second pair of telescopic members (27) as shown in FIG. 17 are configured to provide little flexure, the invention is not so limited and the cross members (28)(29) could be flexible cross members as above-described or otherwise so long as operation of the first pair of telescopic members (26) and the second pair of telescopic members (27) act on the cross members (28)(29) to establish the plurality of pipes (3) within the frame (2) at a height or location to allow at least the first one each (6) of the plurality of pipes to transfer from within the frame (2) to the pipe receiver (16).

Now referring primarily to FIGS. 1, 8, 10, and 18, the pipe conveyor (1) can further include a pipe receiver (16) joined to the frame (2) at a location which allows transfer of the first one (6) of the plurality of pipes (3) from within the frame (2) to a pipe receiver surface (32). As above described, various embodiments of the pipe elevator (15) can establish a plurality of pipes (3) at a location within the frame (2). The height and angle of the pipe elevator (15) can be adjusted such that the first one (6) of the plurality of pipes (3) travels from within the frame (2) to locate on the pipe receiver surface (32) of the pipe receiver (16) (see for example FIGS. 8 and 18).

The non-limiting embodiments of the pipe receiver (16) shown in FIGS. 1, 8 and 18 can pivot or be pivotally coupled to one each of the first pair of vertical members (9) and to one each of the second pair of vertical members (13) joined to the first of the opposed sides (10) of the horizontal rectangular frame (2) to allow rotation (33) about a pipe receiver rotation axis (34) (See FIG. 1). As to the embodiment of the pipe receiver (16) shown by FIG. 1, a first pipe receiver shaft (35) and a second pipe receiver shaft (36) can be disposed a distance "x" apart (37) by use of a plurality of pipe receiver cross members (38) each having a pair of pipe receiver cross member ends (39)(40) one each coupled to a corresponding one each of the first shaft (35) and the second shaft (36). The first pipe receiver shaft (35) can be pivotally coupled to at least one each of the first pair of vertical members (9) and one each of the second pair of vertical members (13) joined to the first of the opposed sides (10) (or the second of the opposed sides (11) depending on the application) of the horizontal rectangular frame (2) to allow rotation (33) about the pipe receiver rotation axis (34). The first pipe receiver shaft (35) and the second pipe receiver shaft (36) and the plurality of pipe receiver cross members (38) can provide the pipe receiver surface (32) on which the first one (6) of the plurality of pipes (3) (and subsequent ones of the plurality of pipes (3)) can be received or travel upon. Understandably, many constructional forms of the pipe receiver (16) and pipe receiver surface (32) are possible so long as the pipe receiver surface (32) provides sufficient surface area (whether continuous or discontinuous surface area) to accept one or more of the plurality of pipes (3) as shown by the figures. As to certain embodiments of the pipe conveyor (1), the pipe receiver (16) may not pivot but may have a fixedly coupled pipe receiver surface configured to allow the first one (6) of the plurality of pipes (3) to be transferred from within the frame (2) to the pipe receiver (16) and subsequently transferred to the pipe support surface (56), as further described below. Again other embodiments of the pipe receiver (16) and the pipe receiver surface (32) may be operated independent of any coupling to the frame (2) so long as the location and operation allows a first one (6) (and subsequent one each of the plurality of pipes (3)) to transfer from within the frame (2) to the pipe receiver surface (32). Similarly, as to those embodiments of the pipe conveyor (1) which operate to disassemble pipe and return the individual pipes to within the frame (2), the pipe receiver (16) and the pipe receiver surface (32) can be configured in any manner which can receive the individual disassembled pipes transferred from the pipe support surface (56) and allows transfer of each disassembled pipe to within the frame (2).

Now referring primarily to FIGS. 8, 9, 10, and 18, the pipe conveyor (1) can further include one or more pipe check(s) (42) which check the travel of the first one (6) of the plurality of pipes (3) (and subsequent ones of the plurality of pipes) on the pipe receiver surface (32) by providing a first pipe transfer check element (43) which in a first pipe transfer check element position (44) engages a part of the external surface of the first one (6) of the plurality of pipes (3), as shown for example in FIGS. 8 and 9. The embodiment of the pipe check (42) shown by FIGS. 8 and 9 can be rotatably coupled to the second pipe receiver shaft (36) of the pipe receiver (16) to allow the first pipe transfer check element (43) to rotate (45) about a pipe check rotation axis (127) to alter the engagement between the first pipe transfer check element (43) and the first one (6) of the plurality of pipes (3). As the first pipe transfer check element (43) rotates (45) about the pipe check rotation axis (127), the first pipe transfer check element (43) can be established at a second position (46) which allows the first one (6) of the plurality of pipes (3) to travel (47) over the surface of the first pipe check element (43) to disengage the first pipe transfer check element (43) from the first one (6) of the plurality of pipes (3) and fall (48) from the pipe receiver (16) under the influence of gravity as shown by FIG. 9. Rotation of each one of the pipe check(s) (42) about the pipe check rotation axis (127) can be achieved for example by a pipe check pivot member (52) pivotally coupled at a location on the pipe check (42) which upon vertical travel (51) generates rotational travel of the pipe check (42) about the pipe check rotation axis (127). As a non-limiting example the pipe check pivot member (52) can be pivotally coupled proximate to the second pipe transfer check element (49). The pipe check pivot member (52) can be configured as an elongate member as shown in FIG. 9 with vertical travel (51) generated by operation of a telescopic member such as a hydraulic or pneumatic cylinder. Alternately the pipe check pivot member (52) can in itself be a telescopic member such as a hydraulic or pneumatic cylinder or the pipe check pivot member (52) can be operated by upward travel of the pipe transfer element (53) further described below.

As shown by FIGS. 17, 18 and 19, an alternate embodiment of the pipe check (42) can be coupled to the external surface of the second pipe receiver shaft (36). The second pipe receiver shaft (36) can be rotationally coupled to the plurality of cross members (38) (as shown for example by FIG. 1) such that a second pipe receiver shaft rotation generation means (124) (for example an electric motor which drives a continuous drive belt or chain about a toothed sprocket or pulley coupled to the external surface of the second pipe receiver shaft (36) as shown by FIGS. 1 and 17) can rotate the second pipe receiver shaft (36) about a second pipe receiver axis (126) to allow travel of the first pipe transfer check element (43) from the first position (44) to the second position (46) to allow the first one (6) of the plurality of pipes to travel from the pipe receiver surface (32) and fall (48) to engage the pipe transfer element (57). As discussed above, rotation of the first pipe transfer check element (43) can be coordinated with a second pipe transfer check element (49) to check travel of the second one (7) of the plurality of pipes (3) as the first one (6) of the plurality of pipes travels to the pipe transfer element (57).

Now referring primarily to FIG. 19, the pipe transfer element (57) can be established at a location to allow the first pipe transfer check element (43) of the pipe check (42) to retrieve the first one (6) of a plurality of pipes (3) from the pipe transfer element (57). By rotation of the second pipe receiver shaft (36) in the opposite direction, the first pipe transfer check element (43) can engage and transfer the first one (6) of the plurality of pipes (3) to the pipe receiver (16) and by rotation of the pipe receiver (16) about the pipe receiver rotation axis (34) the first one (6) of the plurality of pipes (3) can be transferred within the frame (2).

As further shown by FIGS. 8, 9 and 10 the one or more pipe check(s) (42) can each further provide a second pipe transfer check element (49) which rotates (50) about the pipe check rotation axis (127) to engage a part of the external surface of a second one (7) of the plurality of pipes (3) transferred from within the frame (2) to check travel of the second one of the plurality of pipes (7) on the pipe receiver surface (32) as shown in FIG. 10. The disengagement of the first pipe transfer check element (43) from the external surface of the first one (6) of the plurality of pipes (3) can be coordinated with engagement of the second pipe transfer check element (49) with the second one (7) of the plurality of pipes (3) to establish the second one (7) of the plurality of pipes (3) at a fixed location on the pipe receiver surface (32) as the first one (6) of the plurality of pipes (3) falls (48) from pipe receiver (16) as shown in FIG. 9. As to certain embodiments of the pipe receiver (16) which rotate about a pipe receiver axis (34), angle of the pipe receiver surface (32) can be adjusted to assist in generating travel (47) of the first one (6) of the plurality of pipes (3) over the first pipe transfer check element (43) to fall (48) from the pipe receiver (16).

Now referring primarily to FIGS. 1, 10, and 18, the pipe conveyor (1) can further provide a pipe transfer element(s) (53) which travels to a first pipe transfer element location (54) to receive the first one (6) of the plurality of pipes (3) (and subsequent ones of the plurality of pipes) which travel or fall from the pipe receiver (16) (as shown for example in FIG. 10) and travels to a second pipe transfer element location (55) (as shown for example in FIG. 10) to establish the first one (6) of the plurality of pipes (3) (and subsequent ones of the plurality of pipes(3)) on a pipe support surface (56). A non-limiting embodiment of the pipe transfer element (53) can include a pair of pipe transfer members (57) each pivotally coupled proximate to a first pipe transfer member end (58) to a corresponding pair of vertical members (9)(13) joined to the first of the opposed sides (10) of the rectangular horizontal frame (2). Each pipe transfer element (53) can further include a pipe transfer extension element (59) coupled proximate to a second pipe transfer member end (60). Each of the extension elements (59) can be joined perpendicular to the longitudinal axis of each pipe transfer member (57). While the pair of pipe transfer members (57) and the corresponding extension elements (59) can be generated from square or rectangular metal tubes and joined in an L configuration as shown, any constructional form of the pipe transfer element (53) can utilized so long as when rotated about the pipe transfer pivot axis it can be located to receive the first one (6) of the plurality of pipes (3) as it falls (48) from the pipe receiver (16) and can maintain sufficient engagement with the first one (6) of the plurality of pipes (3) until travel of the pipe transfer element (53) establishes the first one (6) of the plurality of pipes (3) on the pipe support surface (56).

Now referring primarily to FIGS. 1 and 14, the pipe support surface (56) can include a first pipe support surface (61) coupled to the first of the opposed sides (10) of the frame (2) to establish the first pipe support surface (61) at distance above the support surface (8) between and substantially perpendicular to the travel paths of the pair of pipe transfer members (53). A second pipe support surface (62) can be coupled to the first of the opposed sides (10) of the frame (2) proximate to the first frame end (12) at substantially the same distance above the support surface (8) as the first pipe support surface (61). The first pipe support surface (61) can engage the central portion (63) of the first one (6) of the plurality of pipes (3) and the second pipe support surface (62) can engage the second pipe end (5) of the first one (6) of the plurality of pipes (3). The first pipe support surface (61) can further include at least one cylindrical member (64) (a pair shown in the embodiment of the pipe conveyor shown by FIGS. 1 and 14 a distance "y" apart) which rotates as the first one (6) of the plurality of pipes (3) travels on the first support surface (61). Similarly, the second pipe surface (62) can further include at least one cylindrical member (64) which rotates as the second end (5) of the first one (6) of the plurality of pipes (3) travels over the second support surface (62). Understandably, the pipe support surface (56) can be configured in many constructional forms and may only include for example the cylindrical members (64) (or other members which extend from the first frame side whether or not rotatable) or otherwise so long as the first one (6) of the plurality of pipes (3) (and subsequent ones of the plurality of pipes (3)) can be supported at a distance above the support surface (8) after disengagement of the pipe transfer element (53).

Now referring primarily to FIGS. 1, 11, 12, 13 and 14, the pipe conveyor (1) can further include a first pipe restraint (65) configured to releaseably engage the first one (6) of the plurality of pipes (3) (the second one (7) of the plurality of pipes (3) as shown by FIG. 14 and subsequent ones of the plurality of pipes (3)) proximate to a first pipe end (4). One non-limiting embodiment of the first pipe restraint (65) as shown primarily by FIGS. 12 and 13 provides a first pipe restraint surface (66) configured to engage a first part of the external surface (67) of the first one (6) of the plurality of pipes (3) proximate to the first pipe end (4) and a second pipe restraint surface (68) configured to engage a second part of the external surface (69) of the first one (6) of said plurality of pipes (3) proximate to the first pipe end (4) and a pipe restraint surface adjustment assembly (70) (as shown for example including a telescopic pipe restraint surface adjustment element (71) which operates to generate rotational travel of a first pipe restraint surface pivot arm (72) about a first pipe restraint surface pivot arm axis (73)) to releasably engage the first pipe restraint surface (66) and the second pipe restraint surface (68) with a corresponding first part of the external surface (67) and second part of the external surface (69) of said first one (6) of said plurality of pipes (3), although the invention is not so limited and variety of construction forms of the first pipe restraint (65) could be used to engage the external surface of the first pipe end (4) of the first one (6) of the plurality of pipes (3).

Now referring primarily to FIGS. 1 and 11, the first pipe restraint (65) can be coupled proximate to a first pivot arm end (74) of a first pipe restraint pivot arm (75) which establishes the first pipe restraint (65) at a height above the support surface (8) allowing the first pipe restraint (65) to engage the first pipe end (4) of the first one (6) of the plurality of pipes (3). The second pivot arm end (76) can be pivotally coupled to a pivot arm shaft (77) which can be rotated (for example by a handle (78) as shown in FIG. 11) about a pivot arm shaft axis (83) to generate rotational travel (80) of the first pipe restraint (65) across the longitudinal axis (79) of the first one (6) of a plurality of pipes (3) to allow the first pipe restraint (65) to be properly located to engage the first pipe end (4) of the first one (6) of the plurality of pipes (3). As to certain embodiments of the pipe conveyor (1), the pivot arm shaft (77) can be rotationally engaged inside of the second pipe receiver shaft (36), or as to other embodiments of the invention the pivot arm shaft (77) can be made rotationally responsive independent of the second pipe receiver shaft (36) such as rotationally responsive to a gearbox driven by a motor.

The first pipe restraint pivot arm (75) can further provide first pipe restraint pivot (81) which allows rotation (82) of the first pipe restraint (65) about a first pipe restraint pivot axis (84) to generate travel of the of the first pipe restraint (65) along the longitudinal axis (79) of the first one (6) of a plurality of pipes (3) supported by the pipe support surface (56) sufficient to engage the first pipe restraint (65) to the first end (4) of the first one (6) of a plurality of pipes (3). Moreover, upon engagement of the first pipe restraint (65) with the first pipe end (4) of the first one (6) of the plurality of pipes (3), travel of the first pipe restraint (65), as above described, allows the first one (6) of the plurality of pipes (3) to be forcibly urged to travel on the pipe support surface (56).

Now referring primarily to FIG. 11, the first pipe restraint pivot arm (75) can further include a first pipe restraint lift (85) which operates to adjust the length of the first pipe restraint pivot arm (75). The first pipe restraint lift (85) can include telescopic engagement of a first pivot arm member (86) and a second pivot arm member (87) with adjustment of the length of the first pipe restraint pivot arm (75) achieved by travel of the second pivot arm member (87) within the first pivot arm member (86). Travel of the second pivot arm member (87) within the first pivot arm member can be generated by increasing or decreasing the length of a line (88) coupled between the first pipe pivot arm member (86) and the second pivot arm member (87), or other mechanical means such as increasing or decreasing the length of a hydraulic cylinder or pneumatic cylinder to which the first pivot member (86) and the second pivot member (87) are responsive. As shown by FIG. 11, the line (88) can also be adjusted in length by engagement of a first line end (89) to the first pivot arm member (86) and engagement of a second line end (90) to the first pipe restraint surface pivot arm (72) such that rotation of the first pipe restraint surface pivot arm (72) about the first pipe restraint surface pivot arm axis (73) generates travel of the line (88) about an annular member (91) thereby decreasing or increasing the length of the line (88) to which the first pivot member (86) and the second pivot member (87) are responsive.

Now referring primarily to FIGS. 14 and 15, the pipe conveyor (1) can further include a second pipe restraint (92) mounted to the support surface (56) at a location which allows the second pipe restraint (92) to engage the first one (6) of the plurality of pipes (3) proximate to the second pipe end (5) as shown in FIG. 14. A second pipe restraint mount (93) secures the second pipe restraint (92) to the support surface (56) and enables the first one (6) of the plurality of pipes (3) engaged by the second pipe restraint (92) to travel on the support surface (56) a distance in line with the longitudinal axis (79) of the first one (6) of the plurality of pipes (3) sufficient to engage the second pipe end (5) of the first one (6) of the plurality of pipes (3) with a first pipe end (4) of a third one (94) of the plurality of pipes (3) restrained by a third pipe restraint (96) secured to the support surface (56) (see FIG. 15 showing travel of the second pipe restraint achieved by utilizing second pipe restraint telescopic members (97) and movement means (122) such as wheels, rollers, or the like). Once the first pipe end (4) of the third one (94) of the plurality of pipes (3) engages the second pipe end (5) of the first one (6) of the plurality of pipes (3) the engagement between the pipes (6) (94) can be secured and each of the first pipe restraint (65), the second pipe restraint (92), and the third pipe restraint (96) can be disengaged from the corresponding pipes (6)(94). While FIGS. 15 and 16 show each show a particular configuration of a pair pipe restraint surfaces (121)(123) which can releasably engage the second end (5) of the first one (6) of the plurality of pipes (3) and the first end (4) of the third one (94) of the plurality of pipes (3), this is not intended to limit the numerous and varied configurations of pipe restraint surfaces which can be utilized to restrain the second pipe end (5) or the first pipe end (4) sufficiently to allow the second pipe end (5) of the first one (6) of the plurality of pipes (3) to be engaged with the first pipe end (4) of the third one (94) of the plurality of pipes.

Moreover one or more of the pipe restraint surfaces (121) (123) can be made to releasably engage (124) the pipe support surface (56) (as shown by FIG. 16) to allow the joined pipes to travel on a greater area of the pipe support surface (56).

Now referring primarily to FIGS. 1 and 14, the pipe conveyor (1) can further provide movement means (98) coupled to the frame (2) to generate travel of the frame (2) over the support surface (8). The movement means can include an engine (99) (reciprocal combustion or otherwise) coupled to a gearbox which upon operation of the engine (99) generates rotation of at least one annular member (100) which engaged with the support surface can generate travel of the frame (2). Steering means (130) operates to alter direction of travel of the movement means (98) on the support surface (8). Travel of the frame (2) over the support surface (8) can correspondingly generate travel of the pipe support surface (56) under the first one (6) of the plurality of pipes (3) such that the first pipe end (4) of the first one (6) of the plurality of pipes (3) can be established at a location on the pipe support surface (56) at which the third pipe restraint (96) can be engaged proximate to the first pipe end (4). Thereafter, the second one (7) of the plurality of pipes (3) retained within the frame (2) can be transferred to the pipe receiver (16) and delivered to the pipe transfer element (57) and positioned on the pipe support surface (56) with the first pipe end (4) of the second one (7) of the plurality of pipes (3) restrained by the first pipe restraint (65) as above described and the second pipe restraint (92) engaged with the second pipe end (5) of the second one (7) of the plurality of pipes (3), as above-described. Again, travel of the second one (7) of the plurality of pipes (3) in the direction of the longitudinal axis on the support surface (56) can engage the second end (5) of the second one (7) of the plurality of pipes (3) with the first end (4) of the first one (6) of the plurality of pipes (3). The method can be repeated to join as many of the plurality of pipes (3) end to end as desired.

Now referring primarily to FIGS. 2-5, the pipe conveyor (1) can further include a pipe cradle (101). As shown by FIGS. 2-4, the pipe cradle (101) can include a first cradle end (102) and a second cradle end (103) each cradle end (102)(103) providing a pair of vertical cradle members (104) each of the pair of vertical cradle members (104) having a first vertical cradle member end (105) joined proximate to one of the opposed ends (106) of a cradle cross member (107) and a second vertical cradle member end (108) which terminates a distance above the support surface (8). Each cradle cross member (107) can further provide a pair of cradle skids (109) one each proximate to each one of the opposed ends (106) of the cradle cross member (107). Between the pair of cradle skids (109), a portion of the cradle cross member (107) can be sufficiently arcuate to lessen or avoid engagement with the support surface (8) or the frame (2) of the pipe conveyor (1). Each of the pair of vertical cradle members (104) of each of the first cradle end (102) and second cradle end (103) can further provide an angled second end (132),as shown for example by FIG. 5. The first cradle end (102) and the second cradle end (103) can be disposed a distance apart in fixed relation by a cradle frame (131) allowing a plurality of pipes (3) to be stacked between the vertical cradle members (104) of each cradle end (102)(103), as shown for example by FIG. 5. A cradle end cap (110) can be coupled to the second vertical cradle member ends (108) of each of the pair of cradle ends (102)(103) to reduce the amount flexure of the vertical cradle members (108) and to allow a plurality of pipe cradles (101) to be stacked upon one another.

Figure 7:
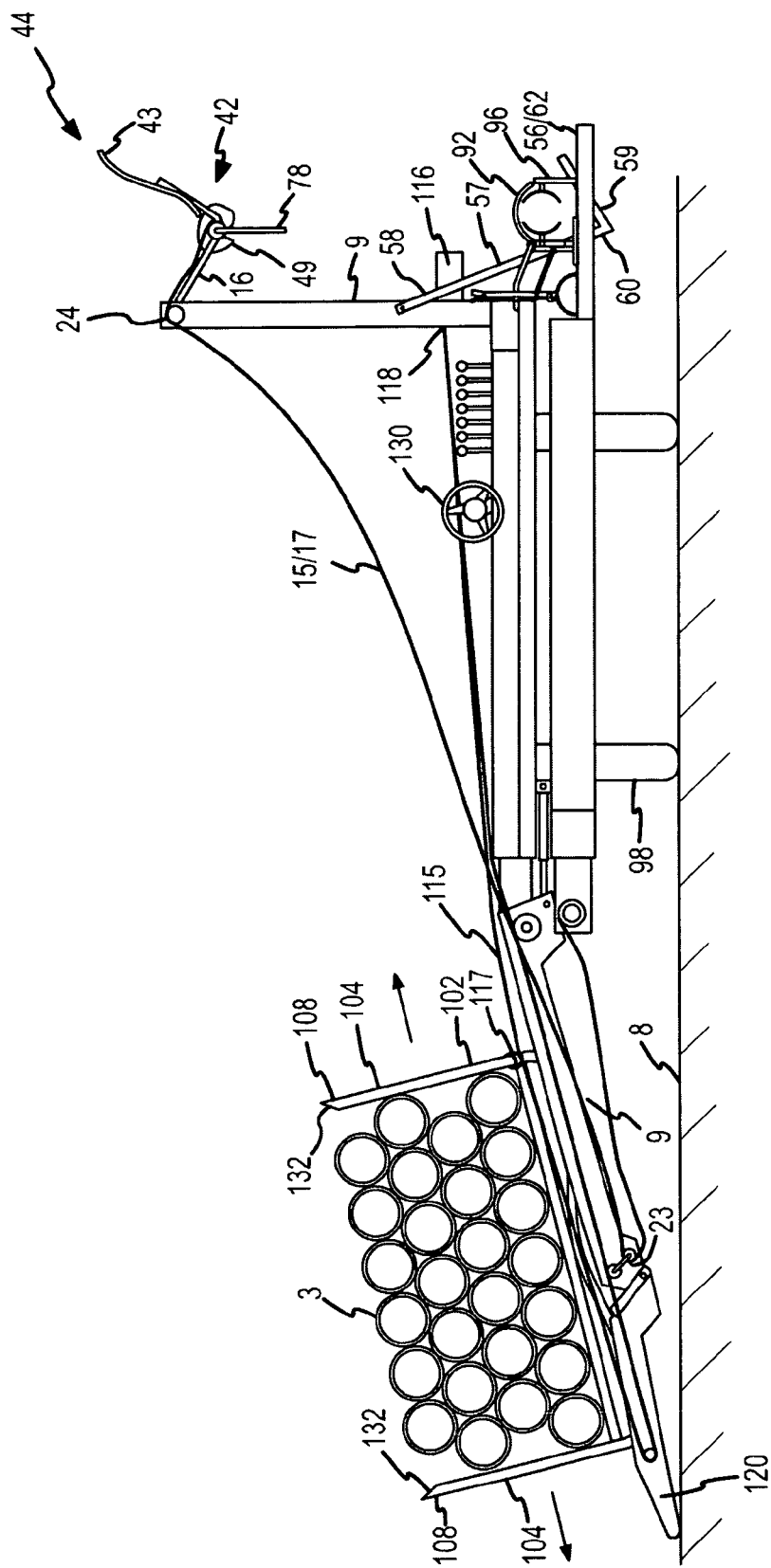
FIG. 7 is an end view of an embodiment of the pipe conveyor invention with one of the first pair of vertical members of the frame established in the second vertical member position to engage a support surface allowing the cradle in which a plurality of pipe are stacked to be transferred from a support surface to the frame of the pipe conveyor.

Now referring to FIGS. 1, 6 and 7, the cradle (101) having a plurality of pipes (3) stacked between the vertical cradle members (104) can be transferred from the support surface (8) to be located within the frame (2) of the pipe conveyor (1). As to certain embodiments of the frame (2), one each of the first pair of vertical members (9) and a one each of said second pair of vertical members (13) joined to the second of the opposed sides (11) of the horizontal rectangular frame (2) can each rotate about a vertical member rotation axis (111) between a first vertical member position (112) and a second vertical member position (113). Rotation of the vertical members joined to the second of the opposed sides (11) of the horizontal rectangular frame (2) about the vertical member rotation axis (111) to the second position (113) can engage the one each of the first pair of vertical members (9) and the one each of the second pair of vertical members (13) joined to the second of the opposed sides (11) of said horizontal rectangular frame (2) with the support surface (8).

As shown by FIG. 7, engagement of one each of the first pair of vertical members (9) and the one each of the second pair of vertical members (13) joined to the second of the opposed sides (11) of the horizontal rectangular frame (2) with the support surface (8) can establish an angled surface (114) between the support surface (8) and the horizontal rectangular frame (2). The cradle (101) having the plurality of pipes (3) stacked between the vertical cradle members (104) can travel on the angled surface (114) to be located within the frame (2) of the pipe conveyor (1). Travel of the cradle (101) on the angled surface (114) can be generated by decreasing (or increasing) the length of a cable (115) coupled between the cradle (101) at a first cable end (117) and a winch (116) (or other cable retraction or winding means) at a second cable end (I 18). As shown by FIG. 6, the rotatable vertical members (9)(13) coupled to the second of the opposed sides (11) of the frame (2) can each further include a track (119) in which each corresponding cradle cross member (107) can slidely engage to generate a travel path for the cradle (101) such that the cradle locates within the frame (2) properly. Rotation of each of the vertical members (9)(13) about the vertical member rotation axis (111) to the first position (112) allows the plurality of pipes (3) to be retained within the frame (2) and conveyed thereafter as above described.

Certain embodiments of the one each of the first pair of vertical members (9) and the one each of said second pair of vertical members (13) joined to the second of the opposed sides (11) of the horizontal rectangular frame (2) which rotate about the vertical member axis (111) between the first vertical member position (112) and the second vertical member position (113) can further include a vertical member projection element (120) which can be established at an angle to the longitudinal axis of the vertical member (9)(13) or can be located to extend the length of the vertical member along the longitudinal axis. As shown by FIG. 6 in broken line, the vertical member projection element (120) can be located to extend the length of angled surface (114) or can be located at an angle to the longitudinal axis of the vertical member (9) (13) to support the end of the vertical member (9)(13) a distance above the support surface (8).

As can be easily understood from the foregoing, the basic concepts of the present invention may be embodied in a variety of ways. The invention involves numerous and varied embodiments of a pipe conveyor and methods of making and using a pipe conveyor.

As such, the particular embodiments or elements of the invention disclosed by the description or shown in the figures accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of an "pipe receiver" should be understood to encompass disclosure of the act of "pipe receiving"—whether explicitly discussed or not—and, conversely, were there effectively disclosure of the act of "pipe receiving", such a disclosure should be understood to encompass disclosure of an "pipe receiver" and even a "means for pipe receiving." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of the pipe conveyors herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth below are intended describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A pipe conveyor, comprising:
   a. a frame configured to within retain a plurality of pipes;
   b. a pipe elevator which establishes said plurality of pipes at a height within said frame;
   c. a pipe receiver joined to said frame, wherein said pipe elevator establishes said plurality of pipes at said height within said frame which allows travel of a first one of said plurality of pipes between said pipe elevator and said pipe receiver;
   d. a pipe support surface discrete from said pipe receiver configured to support said first one of said plurality of pipes located outside of said frame a distance below said pipe receiver; and
   e. a pipe transfer element configured to transfer said first one of said plurality of pipes between said pipe receiver and said pipe support surface.

2. A pipe conveyor as described in claim 1, wherein said frame configured to within retain said plurality of pipes comprises a horizontal rectangular frame provides at least a first pair of vertical members one each coupled to opposed sides of said horizontal rectangular frame proximate to a first frame end and a second pair of vertical members one each coupled to opposed sides of said horizontal rectangular frame proximate to a second frame end.

3. A pipe conveyor as described in claim 2, wherein said pipe elevator which establishes said plurality of pipes at a height within said frame comprises:
   a. a first flexible member coupled between said first pair of vertical members which engages a first part of an external surface of said plurality of pipes proximate to a plurality of first pipe ends;
   b. a second flexible member coupled between said second pair of vertical members which engages a second part of said external surface of said plurality of pipes proximate to a plurality of second pipe ends; and
   c. a flexible member adjustment means which operates to adjust length of said first flexible member and said second flexible member to establish said plurality of pipes at said height within said frame.

4. A pipe conveyor as described in claim 3, wherein said flexible member adjustment means comprises a shaft coupled to each of said first flexible member and said second flexible, and wherein said shaft rotates to windingly engage a part of said first flexible member and a part of said second flexible member.

5. A pipe conveyor as described in claim 2, wherein said pipe elevator which establishes said plurality of pipes at a height within said frame comprises:
   a. a first pair of vertical telescopic members coupled to opposed sides of said horizontal rectangular frame proximate to said first frame end;
   b. a second pair of vertical telescopic members coupled to opposed sides of said horizontal rectangular frame proximate to said second frame end;
   c. a first cross member having one each of a pair of first cross member ends coupled to a corresponding one each of said first pair of vertical telescopic members;
   d. a second cross member having one each of a pair of second cross member ends coupled to a corresponding one each of said second pair of vertical telescopic members; and e. a telescopic member adjustment means which operates to adjust length of each of said first pair of telescopic members and said second pair of telescopic members to establish said plurality of pipes at said height within said frame.

6. A pipe conveyor as described in claim 1, wherein said pipe receiver pivots in relation to one each of said first pair of vertical members and one each of said second pair of vertical members joined to a first of said opposed sides of said horizontal rectangular frame to allow said pipe receiver to rotate about a pipe receiver rotation axis.

7. A pipe conveyor as described in claim 6, wherein said pipe receiver comprises a first shaft and a second shaft disposed a distance "x" apart, wherein said first shaft pivots in relation to one each of said first pair of vertical members and one each of said second pair of vertical members joined to said first of said opposed sides of said horizontal rectangular frame, and wherein a plurality of pipe receiver cross members each have a pair cross member ends joined to a corresponding one each of said first shaft and said second shaft to provide a pipe receiver surface on which said first one of said plurality of pipes travels.

8. A pipe conveyor as described in claim 7, wherein rotational travel of said pipe receiver about said pipe receiver rotation axis provides variable adjustable angle of said pipe receiver surface to generate travel of said first one of said plurality of pipes between said pipe elevator and said pipe receiver.

9. A pipe conveyor as described in claim 8, wherein said pipe transfer element which engages said first one of said plurality of pipes to transfer said first one of said plurality of pipes between said pipe receiver and said pipe support surface comprises a pair of pipe transfer members each pivotally coupled to a corresponding one each of said first pair of vertical members and said second pair of vertical members joined to said first of said opposed sides of said horizontal rectangular frame.

10. A pipe conveyor as described in claim 9, wherein said pipe support surface configured to support said first one of said plurality of pipes comprises a pair of cylindrical members each disposed perpendicular to said frame a distance "y" apart.

11. A pipe conveyor as described in claim 10, further comprising a first pipe restraint configured to releaseably engage said first one of said plurality of pipes proximate to a first pipe end.

12. A pipe conveyor as described in claim 11, further comprising a pivot arm coupled to said first pipe restraint.

13. A pipe conveyor as described in claim 12, wherein said pivot arm travels about a first pivot arm axis which locates said first pipe restraint in a first pivot arm plane.

14. A pipe conveyor as described in claim 13, wherein said pivot arm travels about a second pivot arm axis which locates said first pipe restraint in a second pivot arm plane.

15. A pipe conveyor as described in claim 14, wherein said pivot arm has variably adjustable length to locate said first pipe restraint in a third pivot arm plane.

16. A pipe conveyor as described in claim 11, wherein said first pipe restraint comprises:
a. a first pipe restraint surface configured to engage a first part of said external surface of said first one of said plurality of pipes;
b. a second pipe restraint surface configured to engage a second part of said external surface of said first one of said plurality of pipes; and
c. a pipe restraint surface adjustment assembly which operates to releasably engage said first pipe restraint surface and said second pipe restraint surface with a corresponding said first part of said external surface of said second part of said external surface of said first one of said plurality of pipes.

17. A pipe conveyor as described in claim 11, further comprising a second pipe restraint configured to releasably engage said first one of said plurality of pipes proximate to a second pipe end.

18. A pipe conveyor as described in claim 17, wherein said second pipe restraint allows said first one of said plurality of pipes to travel a distance to establish said second pipe end of said first one of said plurality of pipes at a first pipe location on said pipe support surface.

19. A pipe conveyor as described in claim 18, further comprising a third pipe restraint configured to releasably engage a second one of said plurality of pipes proximate to a first pipe end to establish said first pipe end of said second one of said plurality of pipes at a second pipe location on said pipe support surface.

20. A pipe conveyor as described in claim 19, wherein travel of said distance to establish said second pipe end at a first pipe location on said pipe support surface inserts said second pipe end of said first one of said plurality of pipes into said second pipe end of said second one of said plurality of pipes.

21. A pipe conveyor as described in claim 20, wherein a one each of said first pair of vertical members and a one each of said second pair of vertical members joined to a second of said opposed sides of said horizontal rectangular frame each rotate about a vertical member axis between a first vertical member position and a second vertical member position.

22. A pipe conveyor as described in claim 21, wherein rotation about said vertical member axis engages said one each of said first pair of vertical members and said one each of said second pair of vertical members joined to a second of said opposed sides of said horizontal rectangular frame with a support surface.

23. A pipe conveyor as described in claim 22, wherein engagement of said one each of said first pair of vertical members and said one each of said second pair of vertical members joined to a second of said opposed sides of said horizontal rectangular frame with said support surface generates an angled surface between said support surface and said horizontal rectangular frame.

24. A pipe conveyor as described in claim 23, further comprising a pipe cradle which holds said plurality of pipes, and wherein said pipe cradle travels from said support surface to within said frame on said angled surface to locate said plurality of pipes within said frame.

25. A pipe conveyor as described in claim 24, further comprising:
a. at least one cable which releasably couples to said cradle; and
b. at least one winch which operates to variably adjust the length of said cable to generate travel in said cradle from said support surface to within said frame.

* * * * *